US005719371A

United States Patent [19]

Spariat

[11] Patent Number: 5,719,371

[45] Date of Patent: Feb. 17, 1998

[54] PLASMA TORCH WITH INTEGRATED INDEPENDENT ELECTROMAGNETIC COIL FOR MOVING THE ARC FOOT

[75] Inventor: Jacques Jean-Marie Spariat, Saint Medard En Jalles, France

[73] Assignee: Aerospatiale Societe Nationale Industrielle, Societe Anonyme, Paris, France

[21] Appl. No.: 665,910

[22] Filed: Jun. 19, 1996

[30] Foreign Application Priority Data

Jun. 23, 1995 [FR] France .................................. 95 07791

[51] Int. Cl.$^6$ ...................................................... B23K 10/00

[52] U.S. Cl. ............... 219/121.49; 219/123; 219/121.48; 219/121.52

[58] Field of Search ......................... 219/121.48, 121.49, 219/123, 121.52, 121.53, 121.59, 74, 75; 313/231.31, 23.41

[56] References Cited

U.S. PATENT DOCUMENTS

| | | | |
|---|---|---|---|
| 3,663,792 | 5/1972 | Fey | 219/121 P |
| 3,832,519 | 8/1974 | Wolf et al. | 219/121 P |
| 4,668,853 | 5/1987 | Fey et al. | 219/121.49 |
| 4,847,466 | 7/1989 | Pasquini et al. | 219/121.59 |
| 5,132,511 | 7/1992 | Labrot et al. | 219/121.49 |
| 5,210,392 | 5/1993 | Labrot et al. | 219/121.52 |
| 5,262,616 | 11/1993 | Labrot et al. | 219/121.49 |

FOREIGN PATENT DOCUMENTS

| | | |
|---|---|---|
| 0427590 | 5/1991 | European Pat. Off. . |
| 2609358 | 7/1988 | France . |
| 2654295 | 5/1991 | France . |

*Primary Examiner*—Mark H. Paschall

*Attorney, Agent, or Firm*—Greenblum & Bernstein, P.L.C.

[57] ABSTRACT

The present invention concerns a plasma torch with an integrated independent electromagnetic coil for moving the arc foot. The torch includes a bare torch portion housing a single upstream electrode or a pair of coaxial upstream and downstream electrodes. The electrodes are tubular and are cooled by an appropriate cooling circuit. An injection mechanism injects plasma gas downstream of the upstream electrode or between the upstream electrode and the downstream electrode. A starter mechanism ensures starting of the torch. A field coil moves the arc foot. The field coil has a generally cylindrical shape and is formed of a set of three supports made of an electrically non-conducting material with the shape of coaxial cylindrical tubes connected at one extremity of the unit to a crown provided with an electric connection mechanism. The electric connection mechanism is connected to at least one helical winding provided on at least one of the faces of one of the three cylindrical supports. The unit is moveable and able to be inserted in the bare torch around the upstream electrode.

19 Claims, 8 Drawing Sheets

PLASMA TORCH WITH INTEGRATED INDEPENDENT ELECTROMAGNETIC COIL FOR MOVING THE ARC FOOT

BACKGROUND OF THE INVENTION

1. Field of the Invention

The present invention generally concerns industrial plasma torches and more particularly an electromagnetic coil for moving the arc foot of these torches.

2. Discussion of Background

The principle of this coil, known as a field coil, is well known. In a transferred arc plasma torch with a single upstream electrode, the other downstream electrode being outside the torch, as well as in a non-transferred arc plasma torch with two upstream and downstream electrodes disposed within the torch, a field coil is used to compel the electric arc foot opposite the upstream electrode to move in order to reduce and distribute wear of the electrode caused by erosion due to the arc.

In non-transferred arc type plasma torches, this coil is generally provided in two ways.

As described in FR-A-2.609.358, the field coil is independent of the plasma torch and engaged externally on the casing of the torch containing the upstream electrode. This embodiment proves to be costly and takes up a large amount of space.

As described in FR-A-2.654.295, the field coil is firmly integrated in the upstream electrode it tightly surrounds so that it is totally dependent on this electrode as regards the diameter and axial position and as regards the series type electrical connection.

SUMMARY OF THE INVENTION

The present invention seeks to avoid these various drawbacks by offering a new field coil conception ensuring both independence and integration with regard to the upstream electrode and offering modularity which being associated with the movable nature of the coil, makes it possible to equip a given torch with field coils with different characteristics.

To this effect, the invention concerns a plasma torch with an integrated independent electromagnetic coil for moving the arc foot. The torch includes a bare torch portion housing a single upstream electrode or a pair of coaxial upstream and downstream electrodes, the electrodes being tubular and cooled by a suitable cooling circuit. A field coil moves the arc foot and means to inject a plasma gas downstream of the upstream electrode or between the upstream electrode and the downstream electrode, means further being provided to ensure starting of the torch. The field coil has the general shape of a cylinder and is formed of coaxial cylindrical tubes connected to one extremity of said unit, to a crown provided with electric connection means connected to at least one helical winding provided on at least one of the faces of one of the three above-mentioned cylindrical supports, said unit being movable and able to be inserted on the bare torch around said upstream electrode.

According to one application of the invention, the torch is of the type comprising a bare torch whose bearing structure is formed of three coaxial casings partially overlapping, that is, an external casing, an intermediate casing defining with the external casing the return circuit of the cooling fluid of the hot portion of the torch, and an internal casing defining with the intermediate casing the plasma gas intake circuit and channeling via its internal face the entering flow of the cooling fluid in the direction of the upstream electrode, the field coil and subsequently the downstream electrode. The coil is inserted between the upstream electrode and a portion or extension of the internal casing and wherein the electric connection means of the coil is formed of two connection pins integral with said crown and disposed parallel to the axis of the torch and able to receive via plugging electric connection rods extending inside the internal casing and connected at their extremity to electric terminals provided on said external structure.

According to a further characteristic of the invention, the central cylindrical support of said unit is disposed so as to establish a communication on the side of its extremity orientated towards said crown between the spaces delimited between the central support and the two adjacent supports. The coil is inserted in the torch or disposed so that the fluid, once it has cooled the outer face of the upstream electrode, penetrates between the central support and the internal support and then between the central support and the external support.

According to one embodiment, the coil comprises two helical windings placed respectively on the two opposing faces of the central cylindrical support.

According to another embodiment, the coil comprises four helical windings placed respectively on the two opposing faces of the central cylindrical support and on the two faces opposite the other two cylindrical supports.

This design of the field coil makes it possible to render the upstream electrode independent and change the coil so as to subsequently implement different electric configuration, that is, with a different number of windings and having a different power and spatial disposition.

The coil exhibits remarkable compactness and is easily integrated in the torch and especially in the cooling circuit of the electrode(s).

Several electric connecting modes, individual, series or parallel with a common connecting point between the coil and the upstream electrode, are possible.

Similarly, it is possible to position the coil axially with respect to the upstream electrode by adapting the length of the electric connection rods.

Other characteristics and advantages shall appear more readily from a reading of the following description of one embodiment of a plasma torch provided with a field coil conforming to the invention, said description being given solely by way of example.

DETAILED DESCRIPTION OF THE INVENTION

Figure 1A:
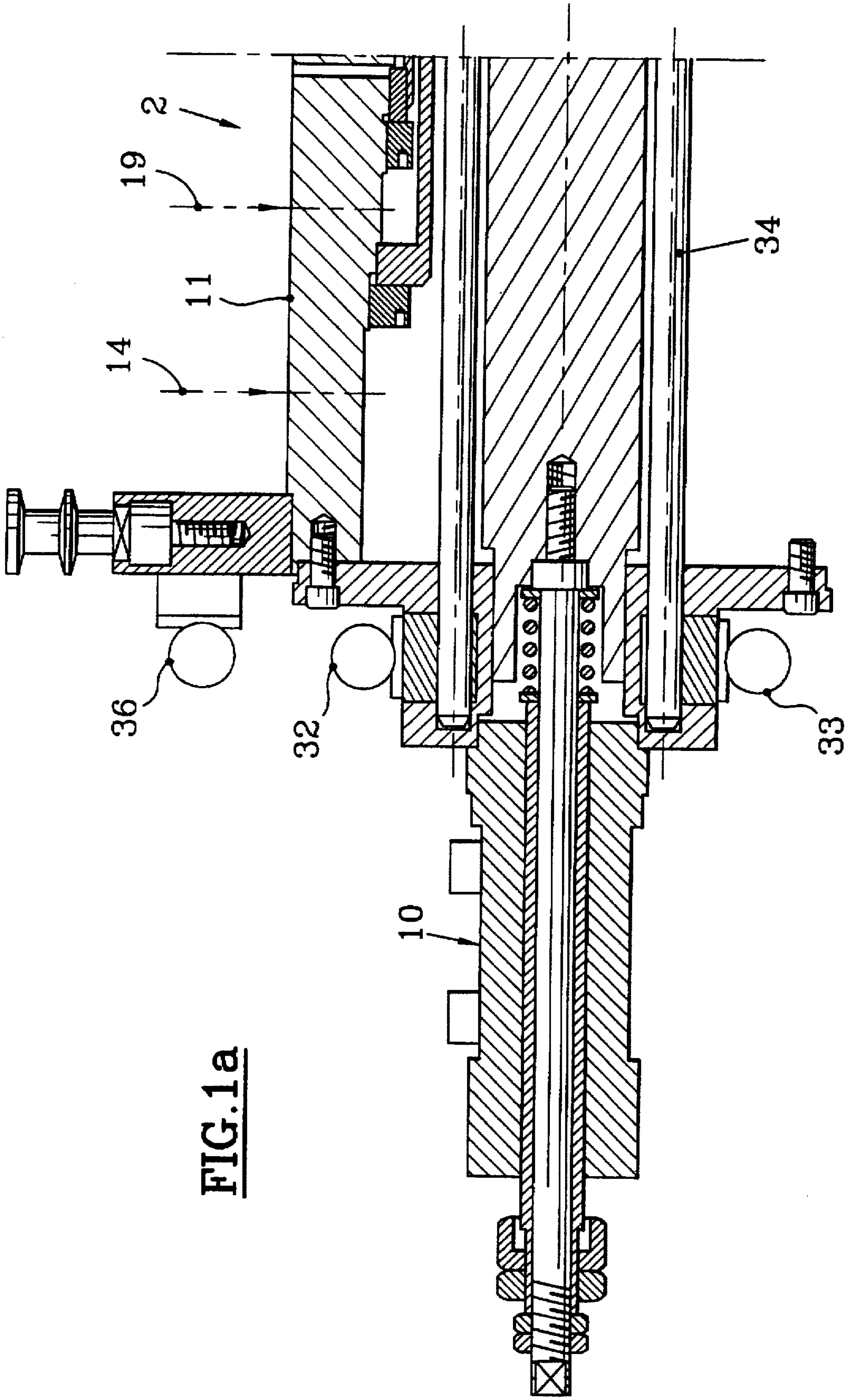
FIG. 1, divided into three portions, respectively 1*a*, 1*b* and 1*c* for the sake of legibility, is a partial axial sectional view of a plasma torch provided with a field coil according to the invention.
Figure 1B:
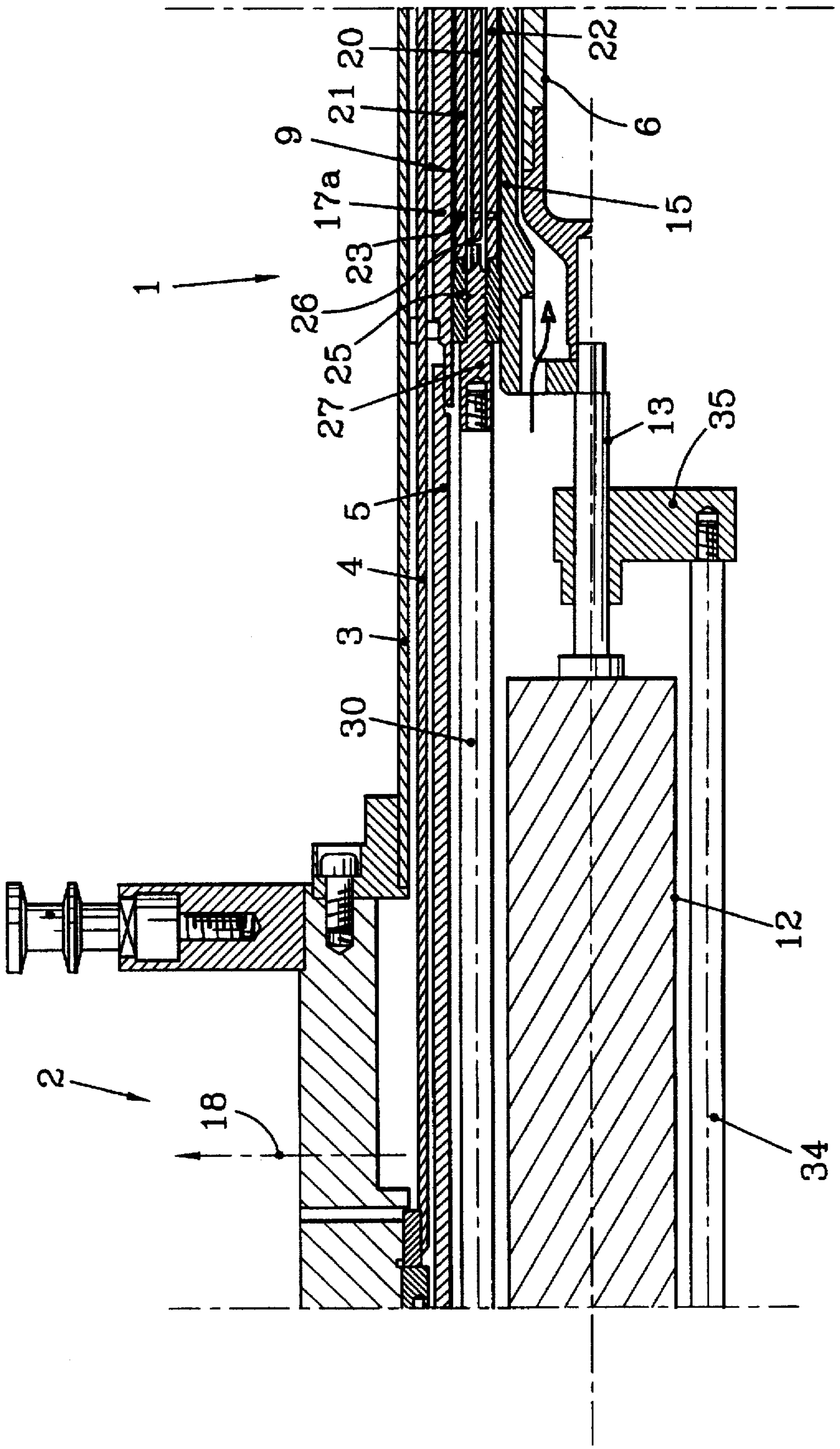
Figure 1C:
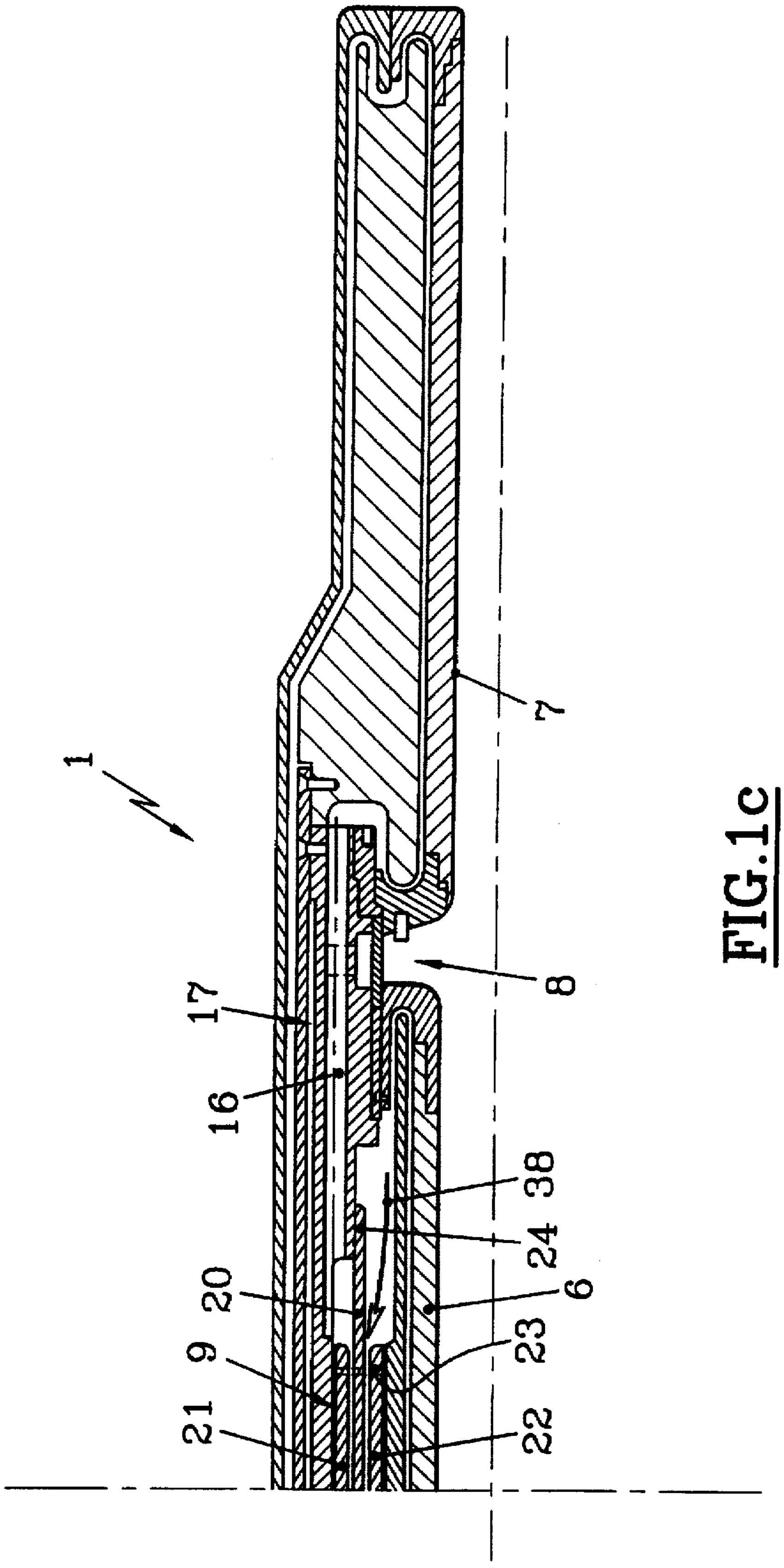

FIG. 1 shows a non-transferred arc type plasma torch. The torch shown in FIG. 1 is also described in co-pending U.S. application Ser. No. 08/666,790, pending.

This torch, able to be used in particular in waste vitrification ovens, includes a bare torch portion 1 formed of three coaxial casings partially overlapping and connected at its rear extremity to an external structure 2 ensuring connections, that is, the fluid and electric links with the outside of the torch.

Disposed in the bare torch 1, which includes an external cylindrical metallic casing 3, an intermediate cylindrical metallic casing 4 and an electrically nonconducting cylindrical casing 5, are disposed an annular upstream electrode 6, an annular downstream electrode 7, a plasma gas injection device 8, between the electrodes 6 and 7, and an annular field coil 9 surrounding the upstream electrode 6.

The upstream electrode 6 can be moved in the direction of the downstream electrode 7 so as to start the torch with the aid of a starter jack 10 disposed outside the cylindrical body 11 of the external structure 2.

The jack 10 acts on the upstream electrode 6 via a set of rods 12, 13 coaxial to the torch, traversing the body 11 and extending inside the internal casing 5.

The cooling of the hot portions of the torch is effected with a fluid, such as demineralised water, penetrating into the body 11 via an intake 14 opening into a space delimited by the body 11 and the internal casing 5 and housing the set of rods 12, 13. The cooling fluid then flows by sweeping the external face of the upstream electrode 6 while being laminated by an annular separator 15 inserted between the electrode 6 and the field coil 9, and then traverses via passages 16 an annular element 17 of the plasma gas injection device 8, sweeps the outer face of the downstream electrode 7 and finally returns to the body 11 via the annular space delimited between the outer 3 and intermediate 4 casings. The fluid comes out of the body 11 via an outlet 18.

The injecting device 8 is fed with plasma gas, air for example, introduced into the body 11 via an intake 19 and routed to the injector by means of the annular space delimited between the intermediate casing 4 and internal casing 5.

For more disclosure of the details of this structure, reference can be made to U.S. application Ser. No. 08/666,790.

In accordance with the present invention, the field coil 9 is formed of an annular cylindrical unit formed of three coaxial cylindrical tubes rendered integral with one another with a specific spacing between the central tube 20 and the internal 22 and external 21 tubes.

The tubes 20, 21 and 22 are made of an electrically nonconducting material with a given gap between the central tube 20 and the lateral tubes 21,22.

The linking between the tubes is effected by nonconducting braces 23.

According to the embodiment shown, the central tube 20 extends by a certain length 24 past the adjacent tubes 21, 22 to the distal extremity of the coil, whereas the proximal extremity of the tube 20 is located at a certain distance from a crown 25 connecting the two external 21 and internal 22 tubes. Thus, the gap between the central tube 20 and the external tube 21 communicates with the gap between the central tube 20 and the internal tube 22 via an annular passage 26 at the bottom of the coil 9.

The crown 25 is provided with two electric connection pins 27 disposed diametrically opposite and orientated towards the internal structure 2.

Figure 2:
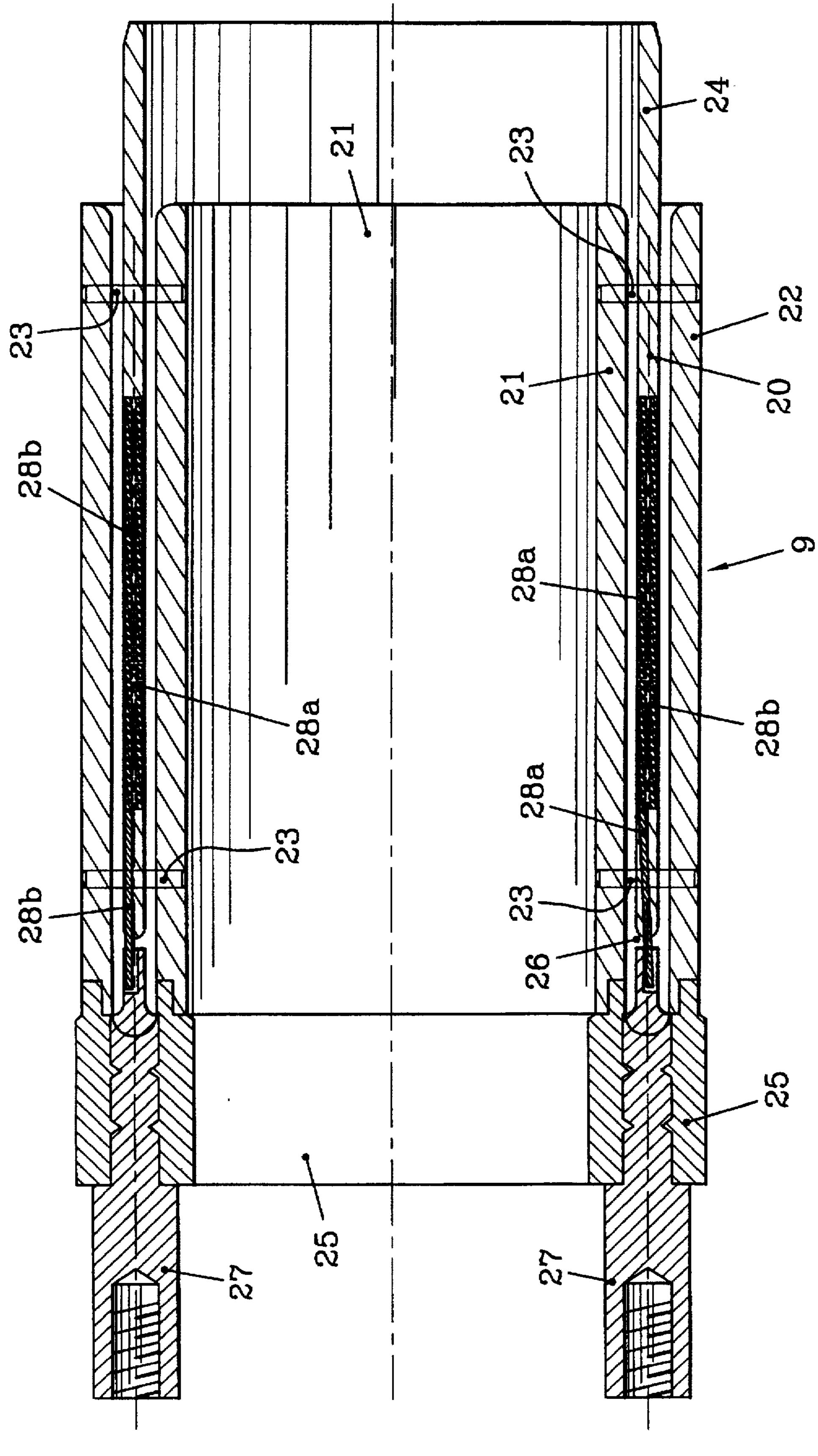
FIG. 2 is an axial cutaway view of a field coil according to a first disposition of helical windings.

In the embodiment of FIG. 2, the pins 27 are connected to two series helical windings, namely an internal winding 28*a* placed on the internal face of the central tube 20 and an external winding 28*b* placed on the outer face of said tube 20. This disposition of the windings having a small section and emitting heat enable them to be cooled, as shall be seen subsequently.

Figure 4:
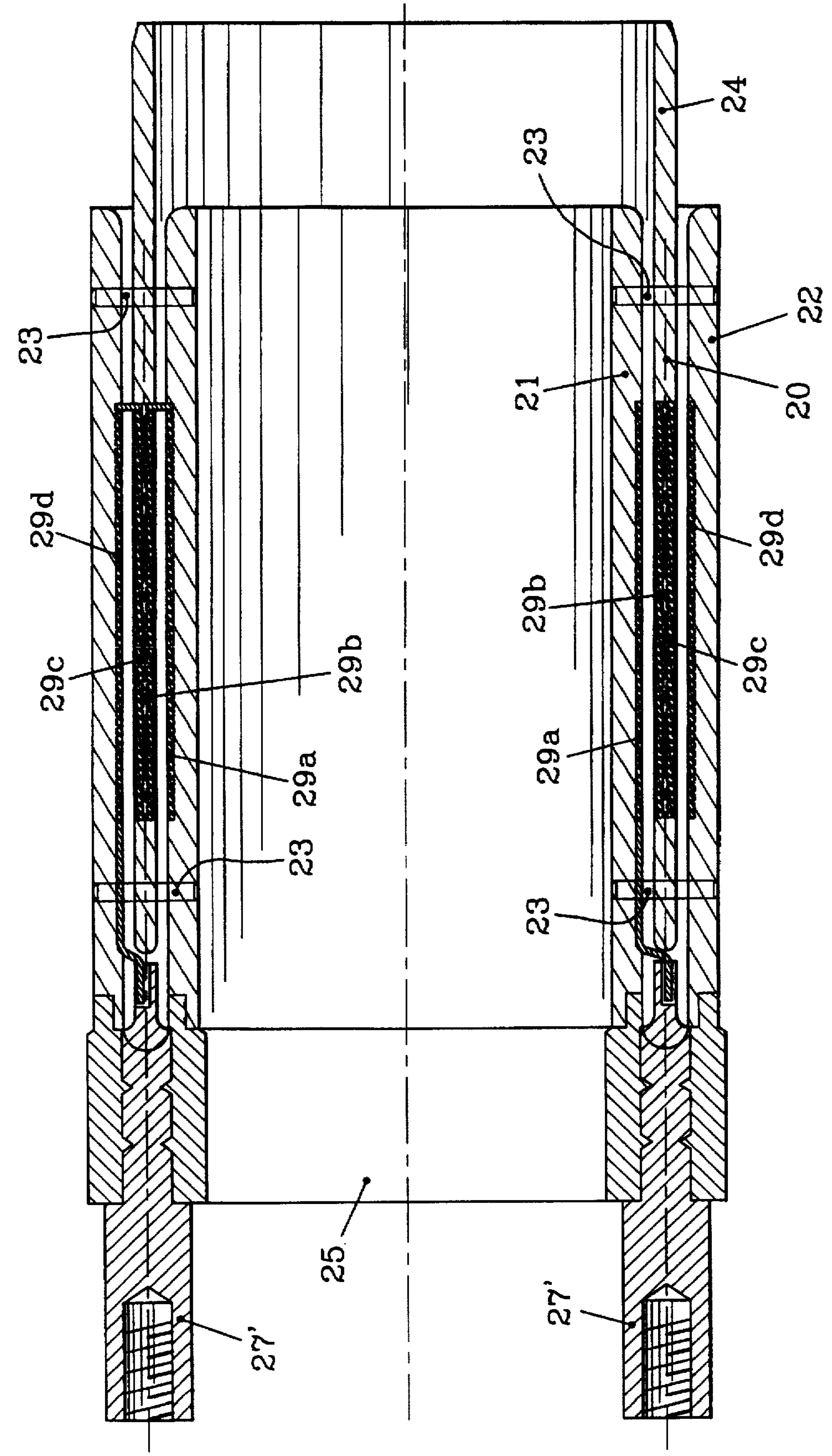
FIG. 4 is a view similar to that of FIG. 2 illustrating a second helical winding disposition.

In the coiling mode of FIG. 4, the pins 27' are series connected to four helical windings 29*a*, 29*b*, 29*c*, 29*d* distributed respectively on the outer face of the internal tube 21, the internal and external faces of the central tube 20 and the internal face of the outer tube 22.

As can be seen in FIGS. 2 and 4, the number, extent and disposition of the winding(s) on the coil 9 may vary so as to have significant flexibility of adaptation of the magnetic field it is desired to obtain.

As shown in FIG. 1, each pin 27 is able to be connected to an electric connection rod 30 parallel to the axis of the torch and extending inside the internal casing 5, traversing the body 11 and connected to a connection terminal 32 accessible outside said body.

In addition, another electric connection terminal 33 accessible outside the body 11 is connected to a rod 34 similar to the rod 30 and extending inside the internal casing 5 by being situated outside the plane defined by the two rods 30, for example by being angularly offset by 90° with respect to these two rods 30.

The rod 34 is connected to a conductive bush 35 mounted sliding on the rod 13 for moving the upstream electrode 6, said rod 13 ensuring the electric connection with said electrode 6.

Various mountings of the coil 9 are possible.

Figure 3:
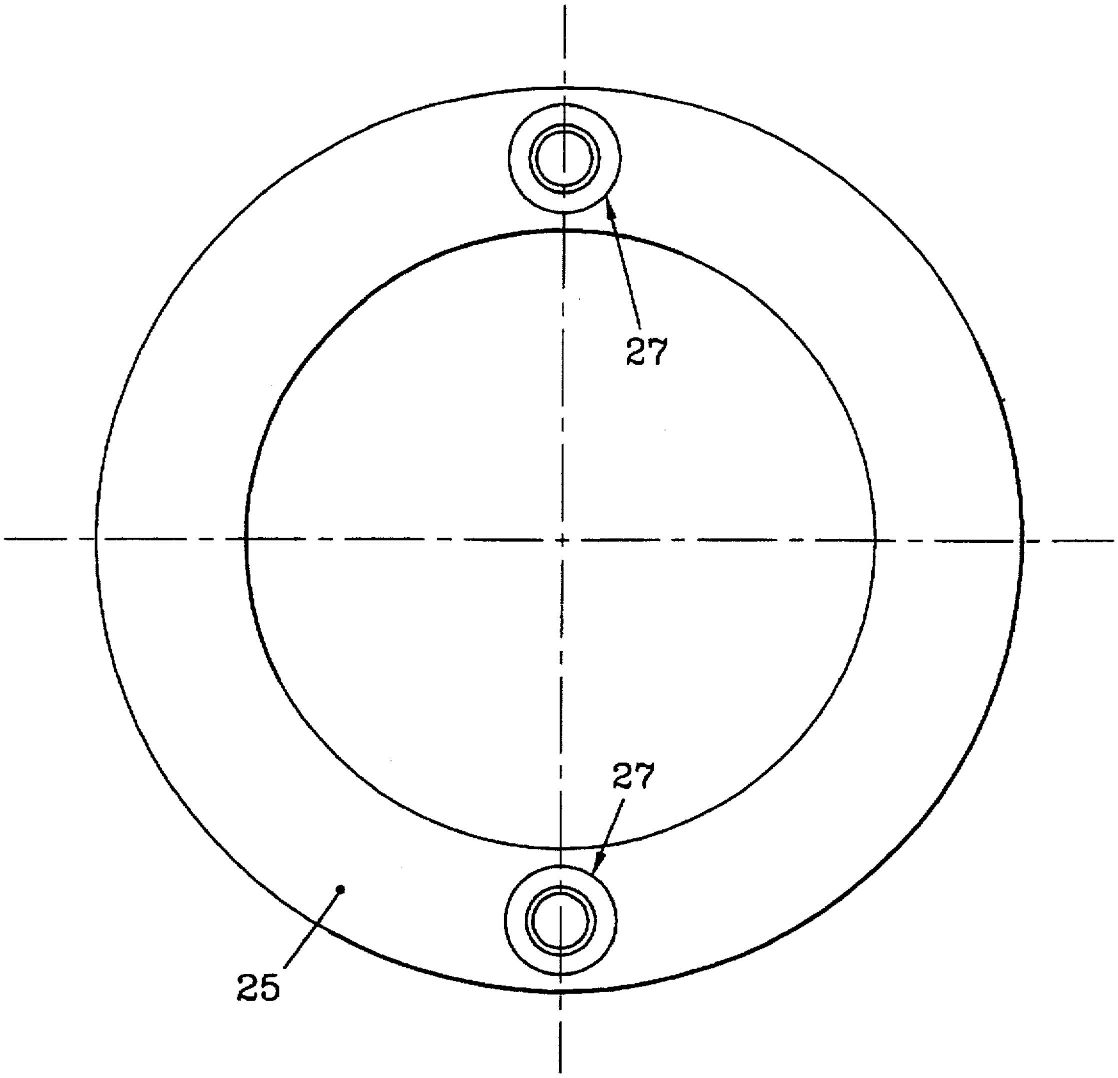
FIG. 3 is a left view of the coil of FIG. 2.
Figure 5A:
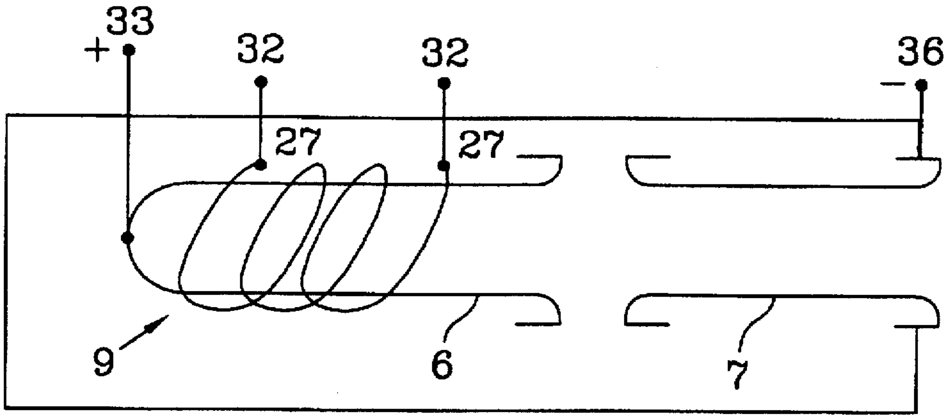
FIGS. 5*a* to 5*c* illustrate three electric connection diagrams relating to the coil.

If it is desired to mount the circuit of the coil 9 independent of that of the electrodes, as shown in FIG. 5*a*, the coil is fed by the two terminals 32 connected to the two pins 27 of the coil. The upstream electrode 6 is fed from the terminal 33 by the rods 13, 34 and the element 35, the return of current from the downstream electrode 7 being carried out by the external casing 3, the body 11 and the terminal 36 of the structure 2. So as to have a maximum distance between the rods 30 and 34 and for improved insulation, it is preferable for the three rods 30 34 to be angularly offset by 120° with respect to one another, the two pins 27 then no longer being diametrically opposed as shown in FIGS. 2 to 4.

Figure 5B:
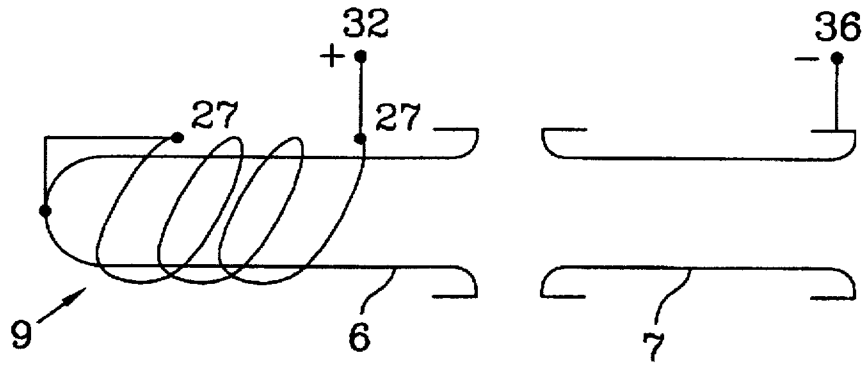
Figure 6:
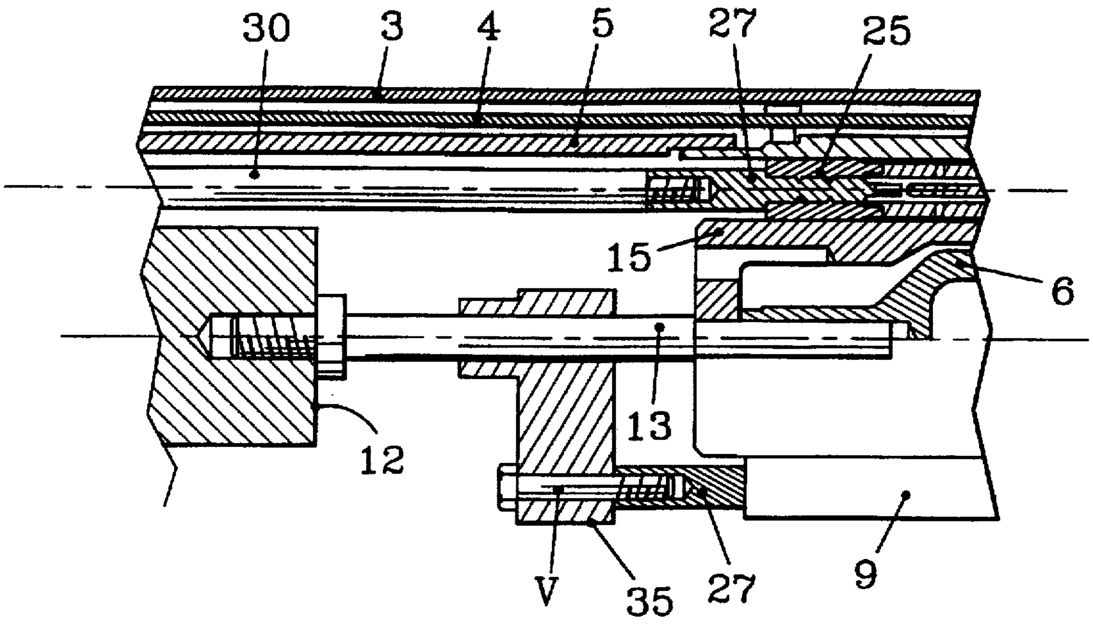
FIG. 6 is a partial view illustrating a series connection mode for the coil.

If it is desired to carry out a mounting of the coil 9 in series with the electrodes as shown in FIG. 5*b*, one of the terminals 27 is connected to the element 35 as shown in FIG. 6 through a connecting screw V, the rod 34 being not mounted.

Figure 5C:
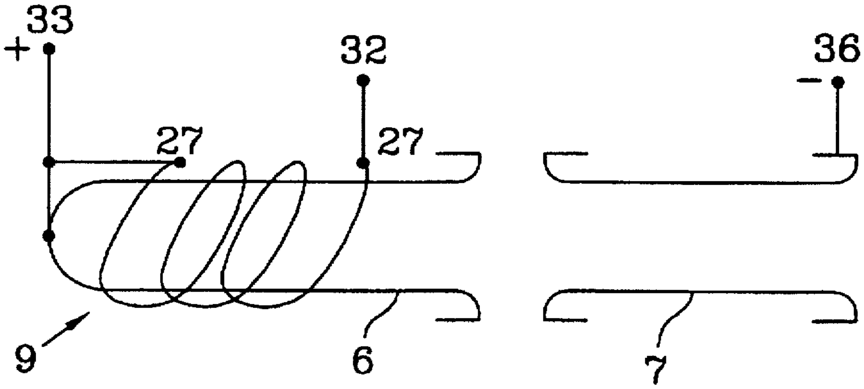
Figure 7:
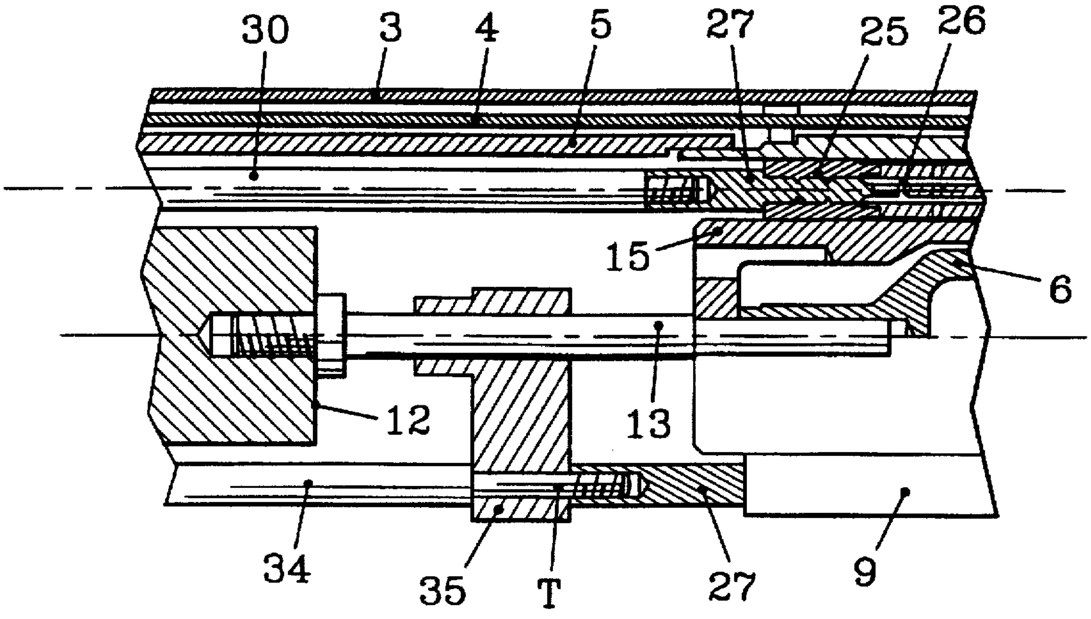
FIG. 7 is a partial view illustrating a parallel connection mode for the coil.

If it is desired to carry out a mounting in parallel as shown in FIG. 5*c*, one of the terminals 32 is connected to one of the pins 27 and the terminal 33 is connected to both the upstream electrode 6 and to the other pin (27) by an auxiliary T connection rod extending the rod 34 and traversing the element 35, as shown in FIG. 7. The advantage of this connection is of placing the coil 9 with the same potential as the upstream electrode 6 so as to avoid disruptive breakdowns while keeping a separate control of the coil and arc as in the independent connection.

It is to be noted that, as shown in FIG. 1, the portion 24 extending past the central tube 20 is in support against one portion of the element 17 of the injection device so as to channel, as indicated by the arrow 38, the cooling fluid originating from the upstream electrode 6 into the gap between the tubes 20 and 22, then into the gap between the tubes 20 and 21 so as to sweep all the winding carrier faces of the coil 9 over their entire length, as well as into the annular passage 26, the electric links between the windings and the pins 27.

The spacing between the tubes 20, 21, 22 of the coil 9 is determined so as to have the desired cooling characteristics.

The support of the extension 24 on the element 17 is sliding and allows free sliding of the coil 9 in its annular housing defined by the separator 15 and an annular extension 17*a* of the element 17 disposed in the extension of the internal casing 5.

According to another characteristic of the device of the invention, it is also possible to axially modify the relative position of the coil 9 with respect to the upstream electrode 6 by replacing the rods 30 by rods of a different length or even by placing at the outer extremity of the rods a device (not shown on the drawings) ensuring a controlled axial movement of said rods according to a specific program, the coil 9 as indicated above being able to slide freely between the separator 15 and the element 17*a*.

Conversely, during movement of the upstream electrode 6 towards the downstream electrode 7 at the time of start up, the separator 15 is able to slide freely inside the coil 9 which remains stationary.

Finally, the invention is not merely limited to the embodiments shown and described above, but on the contrary covers all possible variants, especially as regards the shapes, dimensions and disposition of the three tubular portions 20, 21,22 of the coil support, the disposition, number and mounting of the windings and the coil connection means.

The invention can be applied to all types of plasma torches, transferred arc or non-transferred arc plasma torches, regardless of the type of start up device used, especially regardless of whether the upstream electrode 6 is mobile or not.

I claim:

1. Plasma torch with an integrated independent electromagnetic coil for moving an arc foot of the torch, comprising:

a bare torch portion housing at least one electrode, the at least one electrode being tubular and cooled by a cooling circuit;

a plasma injection mechanism for injecting a plasma gas downstream of one of the at least one electrode;

a starter mechanism for starting the torch; and a field coil for moving the arc foot, wherein the field coil has a general cylindrical shape and is formed of:

i) a coil support made of three coaxial tubes made of an electrically non-conducting material said tubes being connected at one extremity to a crown provided with an electrical connection mechanism said three coaxial tubes comprising an internal cylindrical tube, a central cylindrical tube, and an external cylindrical tube, said central cylindrical tube being disposed so as to establish a communication on a side oriented toward said crown, the communication being formed by spaces between the central cylindrical tube and the other two cylindrical tubes, said spaces being connected to said cooling circuit, and ii) at least one helical winding provided on at least one of the faces of the group consisting of inner and outer faces of said central tube and inner faces of said internal and external tubes, said helical winding being connected to said crown;

said field coil being movable and able to be inserted in the bare torch portion around one of the at least one electrode.

2. The plasma torch of claim 1, wherein the bare torch portion is formed of three coaxial casings partially overlapping, the three coaxial casings including one external casing, an intermediate casing defining with the external casing a return circuit of the cooling fluid of a hot portion of the torch, and an internal casing defining with the intermediate casing a plasma gas intake circuit, the internal casing channeling via an internal face an entering flow of a cooling fluid in a direction of one of the at least one electrode, the field coil, and subsequently a downstream direction, and wherein the coil is inserted between a separator of one of the at least one electrode and an extension of the internal casing, and wherein the electric connection mechanism of the coil comprises two connecting pins integral with said crown and disposed parallel to an axis of the torch and able to receive via plugging electric connection rods, the electric connection rods extending into the internal casing and being connected to electric terminals provided on an external structure of the torch.

3. The plasma torch of claim 1, wherein the field coil is positioned in the torch so that after the fluid has cooled an external face of one of the at least one electrode, the fluid flows between the central cylindrical tube and the internal cylindrical tube, and then the fluid flows between the central cylindrical tube and the external cylindrical tube.

4. The plasma torch of claim 1, wherein the field coil comprises two helical windings placed respectively on two opposing faces of the central cylindrical tube.

5. The plasma torch of claim 1, wherein the three tubes include a central cylindrical tube, and wherein the field coil comprises four helical windings placed respectively on two opposing faces of the central cylindrical tube and on two opposing faces of the other two cylindrical tubes.

6. The plasma torch of claim 2, wherein the central cylindrical tube includes an extension in sliding contact with a support element so as to allow flow of the cooling fluid in a gap between the central cylindrical tube and the internal cylindrical tube while enabling a sliding of the field coil.

7. The plasma torch of claim 1, wherein the field coil is axially position-adjustable with respect to the at least one electrode.

8. The plasma torch of claim 1, wherein the field coil is mounted and can be controlled to move axially.

9. The plasma torch of claim 1, wherein the at least one electrode comprises two electrodes.

10. Plasma torch with an integrated independent electromagnetic coil for moving an arc foot of the torch, comprising:

a bare torch portion housing coaxial upstream and downstream electrodes, the electrodes being tubular and cooled by a cooling circuit;

a plasma injection mechanism for injecting a plasma gas downstream of the upstream electrode;

a starter mechanism for starting the torch; and a field coil for moving the arc foot, wherein the field coil has a general cylindrical shape and is formed of:

i) a coil support made of three coaxial tubes made of an electrically non-conducting material said tubes being connected at one extremity to a crown provided with an electrical connection mechanism said three coaxial tubes comprising an internal cylindrical tube, a central cylindrical tube, and an external cylindrical tube, said central cylindrical tube being disposed so as to establish a communication on a side oriented toward said crown, the communication being formed by spaces between the central cylindrical tube and the other two cylindrical tubes, said spaces being connected to said cooling circuit, and ii) at least one helical winding provided on at least one of the faces of the group consisting of inner and outer faces of said central tube and inner faces of said internal and external tubes, said helical winding being connected to said crown;

said field coil being movable and able to be inserted in the bare torch portion around one of the at least one electrode.

11. The plasma torch of claim 10, wherein the plasma injection mechanism injects the plasma gas between the upstream electrode and the downstream electrode.

12. The plasma torch of claim 10, wherein the bare torch portion is formed of three coaxial casings partially overlapping, the three coaxial casings including one external casing, an intermediate casing defining with the external casing a return circuit of the cooling fluid of a hot portion of the torch, and an internal casing defining with the intermediate casing a plasma gas intake circuit, the internal casing channeling via an internal face an entering flow of a cooling fluid in a direction of the upstream electrode, the field coil, and subsequently the downstream electrode, and wherein the coil is inserted between a separator of the upstream electrode and an extension of the internal casing, and wherein the electric connection mechanism of the coil comprises two connecting pins integral with said crown and disposed parallel to an axis of the torch and able to receive via plugging electric connection rods, the electric connection rods extending into the internal casing and being connected to electric terminals provided on an external structure of the torch.

13. The plasma torch of claim 10, wherein the field coil is positioned in the torch so that after the fluid has cooled an external face of the upstream electrode, the fluid flows between the central cylindrical tube and the internal cylindrical tube, and then the fluid flows between the central cylindrical tube and the external cylindrical tube.

14. The plasma torch of claim 10, wherein the field coil comprises two helical windings placed respectively on two opposing faces of the central cylindrical tube.

15. The plasma torch of claim 10, wherein the field coil comprises four helical windings placed respectively on two opposing faces of the central cylindrical tube and on two opposing faces of the other two cylindrical tubes.

16. The plasma torch of claim 12, wherein the central cylindrical tube includes an extension in sliding contact with a support element so as to allow flow of the cooling fluid in a gap between the central cylindrical tube and the internal cylindrical tube while enabling a sliding of the field coil.

17. The plasma torch of claim 10, wherein the field coil is axially position-adjustable with respect to the upstream electrode.

18. The plasma torch of claim 10, wherein the field coil is mounted and can be controlled to move axially.

19. The plasma torch of claim 10, wherein the bare torch portion is formed of three coaxial casings partially overlapping, the three coaxial casings including one external casing, an intermediate casing defining with the external casing a return circuit of the cooling fluid of a hot portion of the torch, and an internal casing defining with the intermediate casing a plasma gas intake circuit, the internal casing channeling via an internal face an entering flow of a cooling fluid in a direction of the upstream electrode, the field coil, and subsequently the downstream electrode, and wherein the field coil is inserted between a separator of the upstream electrode and an extension of the internal casing, and wherein the electric connection mechanism of the field coil comprises two connecting pins integral with said crown and disposed parallel to an axis of the torch and able to receive via plugging an electric connection rod, the electric connection rod extending into the internal casing and being connected to electric terminals provided on an external structure of the torch.

* * * * *